Figure 1:
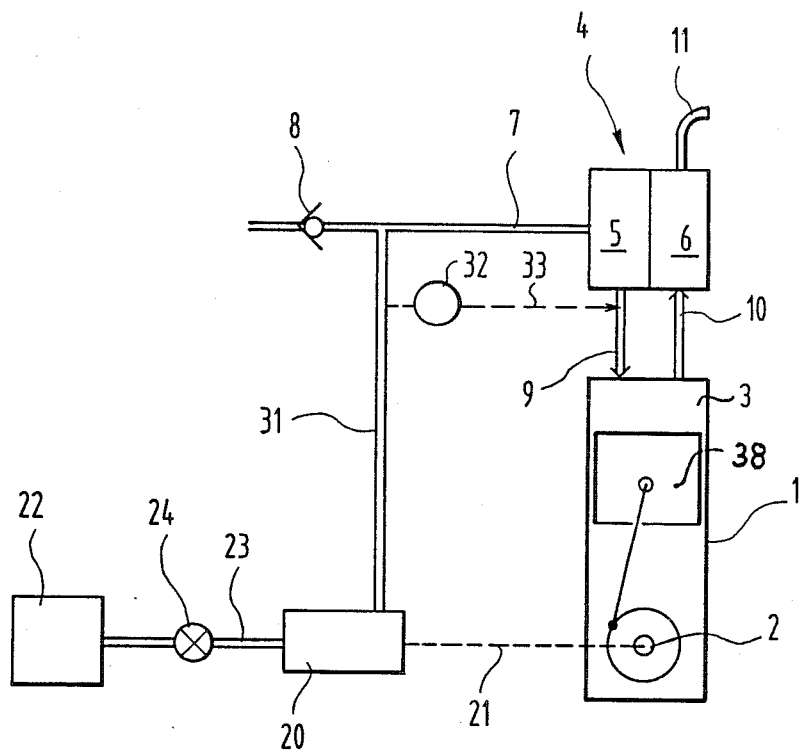

United States Patent [19]

Zoche

[11] Patent Number: 4,781,028

[45] Date of Patent: Nov. 1, 1988

[54] TURBOCHARGED DIESEL ENGINE

[76] Inventor: Michael Zoche, Keferstrasse 13, D-8000 Munchen 40, Fed. Rep. of Germany

[21] Appl. No.: 33,152

[22] PCT Filed: Jul. 16, 1986

[86] PCT No.: PCT/DE86/00291

§ 371 Date: Apr. 29, 1987

§ 102(e) Date: Apr. 29, 1987

[87] PCT Pub. No.: WO87/00576

PCT Pub. Date: Jan. 29, 1987

[30] Foreign Application Priority Data

Jul. 25, 1985 [DE] Fed. Rep. of Germany ....... 3526665

[51] Int. Cl.$^4$ .............................................. F02B 37/00
[52] U.S. Cl. ........................................ 60/612; 60/606; 123/179 F
[58] Field of Search ................. 60/606, 611, 612, 625; 123/179 F

[56] References Cited

U.S. PATENT DOCUMENTS

| 1,893,127 | 1/1933 | Buchi ..................................... 60/606 |
| 2,176,021 | 10/1939 | Grutzner ........................... 60/625 X |
| 2,974,659 | 3/1961 | Wilson ................................. 123/180 |
| 4,232,521 | 11/1980 | Mallofre ............................... 60/612 |

FOREIGN PATENT DOCUMENTS

| 409744 | 2/1925 | Fed. Rep. of Germany ........ 60/606 |
| 490736 | 1/1930 | Fed. Rep. of Germany . |
| 1526455 | 2/1970 | Fed. Rep. of Germany . |
| 893201 | 1/1944 | France . |
| 2396869 | 2/1979 | France . |
| 2410147 | 6/1979 | France . |
| 282834 | 3/1928 | United Kingdom . |

Primary Examiner—Michael Koozo
Attorney, Agent, or Firm—Davis, Bujold & Streck

[57] ABSTRACT

A diesel engine, in particular an aircraft engine with an exhaust gas turbocharger, which comprises a compressor and a turbine, wherein for the engine (1) a compressed air starter (20), for the engine (1), is provided whose exhaust air (31, 31') is directed via the turbocharger (4) into the combustion chamber of the engine (1).

4 Claims, 2 Drawing Sheets

TURBOCHARGED DIESEL ENGINE

The present invention relates to a diesel engine, in particular an aircraft engine, with an exhaust gas turbocharger.

In such diesel engines, the turbocharger ensures the corresponding air charge supply (in a four-cycle diesel engine) or scavenging air supply (in a two-cycle diesel engine) during normal operation. What is problematic is in particular the starting phase, in which the turbine of the turbocharger is subjected either not at all or only slightly to the exhaust gases of the engine. In order to provide the pressure condition necessary for starting, a two-cycle diesel engine can only be started at all after the turbocharger has already been set to work. In the case of a four-cycle diesel engine the turbo effect is delayed. For these reasons the turbocharger is generally run up, before the engine is started, with the aid of foreign energy, e.g. with the aid of a hydraulic motor or a high-speed electromotor or with compressed air; cf. for example German patent No. 490 736.

All these known constructions are quite elaborate and increase the weight and overall size of the engine. This is in particular disadvantageous for aircraft engines, whose weight and overall size should be as small as possible.

The invention is based on the problem of starting a diesel engine of the type in question in which the turbocharger can already be run up during the starting phase with little effort.

This problem is solved by the present invention.

Thus, to start the diesel engine a compressed air starter is used whose exhaust air is utilized in two ways during the starting phase. Firstly, the engine is supplied through the compressed air with sufficient boost pressure or sufficient scavenging air; secondly, the turbocharger is run up at the same time. Using the measure according to the invention, diesel engines can be designed with a lower pressure ratio or compression than up to now. The compression ratio of approx. 23:1 as customary up to now is necessary essentially only for the starting phase, in order to supply the diesel engine with sufficient air charge or scavenging air, whereas a much lower value of approx. 13:1 is sufficient for the normal operating range.

Compressed air starters for diesel engines are known as such, in particular in connection with marine engines or engines for diesel locomotives, in which no special attention must be paid to the overall size. However, in these cases the inventive principle is not exploited.

A construction according to the invention makes it possible to start the engine with compressed air alone, to supply sufficient air charge or scavenging air during the starting phase and at the same time to run up the turbocharger. The only source of energy is, for example, a small compressed air cylinder for the compressed air starter.

With such a construction, a two-cycle diesel engine can start up without the turbocharger being run up by a separate source of energy before the starting. A four-cycle diesel engine runs up much faster than usual with a construction according to the invention.

The exhaust air normally blown off by compressed air starters without being used further is preferably directed to the compressor side of the turbocharger. This can bring the turbocharger to the operating speed particularly fast. It is also possible to supply the exhaust air from the compressed air starter to the turbine of the turbocharger, that is otherwise subjected to the exhaust gases of the engine. This also runs the turbocharger up to the operating speed relatively fast.

If the exhaust air from the compressed air starter is supplied to the compressor side of the turbocharger and then directed into the engine, it is possible to mix with this compressed air stream an additive that increases the ignition performance of the diesel engine. This admixture takes place only during the starting phase and is controlled via the compressed air starter or via its exhaust air. Such an additive is, for example, kerobrisol, of which only small amounts, e.g. 0.5 cm$^3$, are admixed at each starting. This increases the cetane number of the diesel fuel. For the same effect the entire diesel fuel has been mixed with such an additive up to now.

The invention shall be described in more detail with reference to the drawings, in which.

Figure 2:
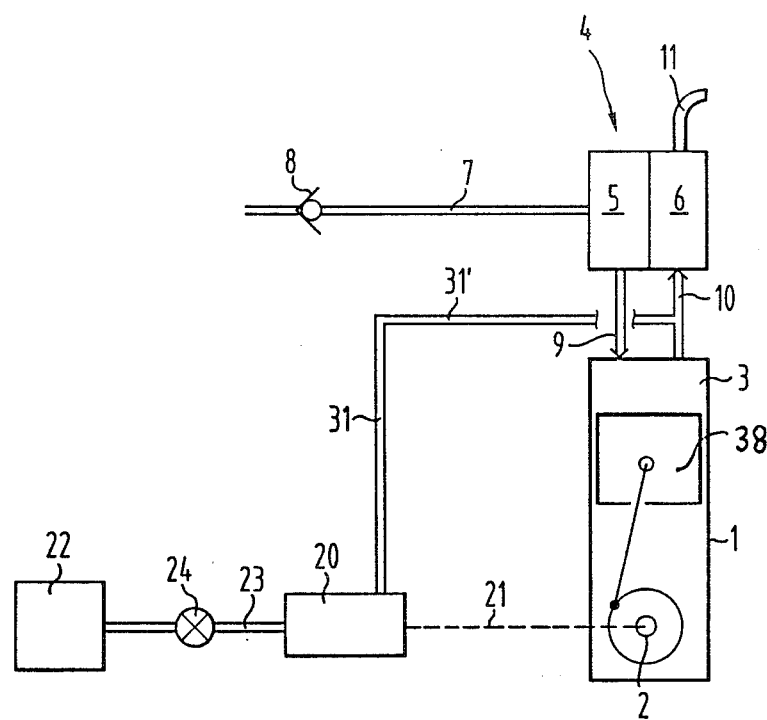

FIG. 1 diagrammatically illustrates a preferred embodiment of the invention; and FIG. 2 diagrammatically illustrates a modified form of the invention.

The diesel engine is referred to in the drawings as 1, its crankshaft as 2 and a piston as 38 and cylinder as 3. The diesel engine is, for example, a two-stroke radial type engine with four cylinders, which is suitable as an aircraft engine.

With this diesel engine 1 an exhaust gas turbocharger 4 is connected which comprises a compressor 5 and a turbine 6. Via a suction pipe 7 and a check valve 8 air is sucked into compressor 5 in normal operation and urged by said compressor into the cylinder 3 of the diesel engine. The pressure pipe leading into the cylinder 3 is referred to as 9. The exhaust gases from engine 1 are directed via an exhaust gas pipe 10 into turbine 6 of turbocharger 4 and then flow through an exhaust 11 into the open.

To start diesel engine 1 (see FIG. 1), a compressed air starter 20 is provided which acts directly on crankshaft 2 of diesel engine 1 via a mechanical connection 21. Compressed air starter 20 is connected with a compressed air source 22 via a pipe 23 with with a starter valve 24. The exhaust air from compressed air starter 20 is directed via an exhaust air pipe 31 into suction pipe 7 of exhaust gas turbocharger 4 and from there directly into the combustion chamber of engine 1. As shown in FIG. 2, exhaust air pipe 31 can be connected by air pipe 31 with exhaust gas pipe 10 on turbine side 6 of turbocharger 4. This also runs turbocharger 4 up during the starting phase.

Further, a reservoir 32 is provided which contains an additive, e.g. kerobrisol. This additive is supplied to the engine to increase its ignition performance only during the starting phase via pipes 33 shown here by dotted lines.

What is claimed:

1. A diesel engine with an exhaust gas turbocharger and a compressed air starter, said turbocharger comprising a compressor and a turbine, the compressor communicating with a suction pipe (7) for sucking air into the compressor and with a pressure pipe (9) leading into a combustion chamber of the engine and the turbine communicating with an exhaust gas pipe (10) coming from the combustion chamber and with an exhaust outlet (11) leading into the open, and said compressed air starter being connected to mechanically drive a crankshaft (2) of the engine and having an exhaust air pipe (31) which is connected to drive the turbocharger (4) and to the combustion chamber of the engine, whereby during starting of the engine compressed air from the starter is fed to the combustion chamber and the turbocharger is driven by compressed air from the starter.

2. A diesel engine according to claim 1, wherein the compressed air from the compressed air starter (20) is directed to the compressor (5) of the turbocharger (4) by way of said suction pipe (7).

3. A diesel engine according to claim 1, wherein the compressed air from the compressed air starter (20) is directed to the turbine (6) of the turbocharger (4) by way of said exhaust gas pipe (10).

4. A diesel engine according to claim 1 wherein means are provided for mixing, with the compressed air from the compressed air starter (20), a substance that increases the ignition performance in the engine (1) during the starting process.

* * * * *